US011938806B2

(12) United States Patent
Finger-Albert et al.

(10) Patent No.: US 11,938,806 B2
(45) Date of Patent: Mar. 26, 2024

(54) INTEGRATED DRIVE SYSTEM

(71) Applicant: Valeo Siemens eAutomotive Germany GmbH, Erlangen (DE)

(72) Inventors: Christian Finger-Albert, Bad Kissingen (DE); Alexander Frank, Bad Kissingen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 731 days.

(21) Appl. No.: 17/052,381

(22) PCT Filed: May 14, 2019

(86) PCT No.: PCT/EP2019/062335
§ 371 (c)(1),
(2) Date: Nov. 2, 2020

(87) PCT Pub. No.: WO2019/219676
PCT Pub. Date: Nov. 21, 2019

(65) Prior Publication Data
US 2021/0086608 A1 Mar. 25, 2021

(30) Foreign Application Priority Data
May 15, 2018 (DE) ...................... 10 2018 111 624.1

(51) Int. Cl.
*B60K 11/02* (2006.01)
*H02K 7/116* (2006.01)
(Continued)

(52) U.S. Cl.
CPC .............. *B60K 11/02* (2013.01); *H02K 7/116* (2013.01); *H02K 9/19* (2013.01); *H02K 11/33* (2016.01);
(Continued)

(58) Field of Classification Search
CPC .... B60K 6/26; B60K 2001/006; H02K 7/116; H02K 9/19; H02K 11/33; H02K 5/203;
(Continued)

(56) References Cited

U.S. PATENT DOCUMENTS 9,030,063 B2    5/2015  Rawlinson et al.
2011/0298314 A1* 12/2011 Atarashi ................ H02K 7/006
                                                310/54

(Continued)

FOREIGN PATENT DOCUMENTS

DE    102012022453 A1    5/2014
DE    102012111962 A1 *  6/2014   ............... B60K 1/00
(Continued)

OTHER PUBLICATIONS

Translation of DE-102012111962-A1; Jun. 2014; Singer.*
(Continued)

*Primary Examiner* — James A Shriver, II
*Assistant Examiner* — Michael T. Walsh
(74) *Attorney, Agent, or Firm* — Manabu Kanesaka

(57) ABSTRACT

The invention is related to an integrated drive system including an electric motor having a stator and a rotor, an inverter configured to control the electric motor, a gearbox configured to transmit a torque provided by the electric motor, and a coolant system, wherein the coolant system includes a cooling fluid, configured to follow one cooling path for cooling the inverter, the rotor, the stator and the gearbox.

8 Claims, 3 Drawing Sheets

(51) Int. Cl.
*H02K 9/19* (2006.01)
*H02K 11/33* (2016.01)
*B60K 6/26* (2007.10)

(52) U.S. Cl.
CPC ............. *B60K 6/26* (2013.01); *B60Y 2200/91* (2013.01); *B60Y 2200/92* (2013.01); *B60Y 2306/05* (2013.01)

(58) Field of Classification Search
CPC ........ H02K 1/32; H02K 5/20; B60Y 2200/91; B60Y 2200/92; B60Y 2306/05
See application file for complete search history.

(56) References Cited

U.S. PATENT DOCUMENTS

| | | | |
|---|---|---|---|
| 2012/0153718 A1* | 6/2012 | Rawlinson | H02K 7/006 307/10.1 |
| 2015/0061424 A1* | 3/2015 | Mogi | H02K 9/19 310/54 |
| 2016/0164378 A1 | 6/2016 | Gauthier et al. | |
| 2020/0280246 A1* | 9/2020 | Deng | B60K 6/405 |

FOREIGN PATENT DOCUMENTS

| | | | | |
|---|---|---|---|---|
| DE | 102012111962 A1 | | 6/2014 | |
| DE | 102012111964 A1 | * | 6/2014 | ............ B60K 1/00 |
| DE | 102013204766 A1 | | 9/2014 | |
| DE | 102013208976 A1 | | 12/2014 | |
| DE | 102013226804 A1 | * | 6/2015 | ............ H02K 5/20 |
| DE | 102013226804 A1 | | 6/2015 | |
| DE | 102015214053 A1 | | 1/2017 | |
| DE | 102015214309 A1 | | 2/2017 | |
| EP | 3028888 A1 | * | 6/2016 | ............ B60K 11/02 |
| EP | 3028888 A1 | | 6/2016 | |
| JP | 2017-028798 A | | 2/2017 | |
| JP | 2017028798 A | * | 2/2017 | |
| WO | 2014/045707 A1 | | 3/2014 | |
| WO | 2018/030371 A1 | | 2/2018 | |
| WO | WO-2018030371 A1 | * | 2/2018 | ............ H02K 21/16 |
| WO | WO-2019208081 A1 | * | 10/2019 | |

OTHER PUBLICATIONS

PCT/ISA/210, "International Search Report for International Application No. PCT/EP2019/062335," dated Jul. 22, 2019.
PCT/ISA/237, "Written Opinion of the International Searching Authority for International Application No. PCT/EP2019/062335," dated Jul. 22, 2019.

* cited by examiner

INTEGRATED DRIVE SYSTEM

RELATED APPLICATIONS

The present application is National Phase of International Application No. PCT/EP2019/062335 filed May 14, 2019, and claims priority from German Application No. DE 10 2018 111 624.1 filed May 15, 2018, the disclosure of which is hereby incorporated by reference herein in its entirety.

FIELD OF THE INVENTION

The present invention relates to an integrated drive system comprising an electric motor, an inverter, and a gearbox.

STATE OF THE ART

In recent years, technologies related to electrical or hybrid, vehicles which are powered by electricity, are being rapidly developed. An electrical or a hybrid vehicle can comprise an electric motor generating a rotation force, an inverter for controlling said electric motor, a battery for supplying power to said inverter, and also a gearbox to transfer a torque to the wheels of the vehicle from the electric motor. It is more and more investigated how to place these components in the vehicle so as to limit the size of the components in the vehicle. To this aim, it is known to provide an integrated drive system which combines these components in one device which is mounted in the vehicle. For instance the publication of U.S. Pat. No. 9,030,063 B2 proposes to integrate an electric motor, an inverter and a gearbox in a single housing.

A main issue of hybrid or electric vehicles remains as to how efficiently cool the components of the integrated drive system. U.S. Pat. No. 9,030,063 B2 proposes a cooling system in which a cooling flow is divided between a first cooling path which cools the rotor of the motor and the gearbox, and a second cooling path which cools the stator of the motor and the inverter. However, this parallel cooling method requires a manifold where the cooling path is divided between the first cooling path and the second cooling path, and a control of the rate flow of the cooling fluid in each cooling path is made. This makes this integrated system of the prior art complicated to implement.

There is therefore a need for an integrated drive system demonstrating an efficient cooling of its components while being more simple to implement.

SUMMARY

The present invention is related to an integrated drive system comprising an electric motor having a stator and a rotor, an inverter configured to control said electric motor, a gearbox configured to transmit a torque provided by the electric motor, and a coolant system. The coolant system comprises a cooling fluid configured to follow one cooling path for cooling the inverter, the rotor, the stator and the gearbox.

Therefore, the integrated system according to the invention implements the cooling of the inverter, the motor and the gearbox with a sole cooling path. Therefore, no complicated derivations are required in the system of the invention, which simplifies its design.

Integrated drive system means that the inverter, the electric motor and the gearbox are arranged together in a same housing, said housing being made for instance in multiple parts. Thereby the integrated system forms one object that allows manipulating the inverter, the electric motor and the gearbox together at the same time. Such an integrated drive system allows integrating all these components in the drivetrain of a vehicle at the same time.

According to an embodiment, the cooling fluid is configured to cool successively the inverter, the rotor, the stator and the gearbox. The parts for which the temperature is a higher concern ranges as follows, from the most impacted by temperature to the less impacted by temperature, the inverter, the rotor, the stator and the gearbox. By cooling the parts which are most impacted by temperature first, the cooling fluid cools these components when its temperature is still low with respect to its temperature at the output, thereby providing more heat dissipation to the parts which necessitate it the most.

Advantageously, said cooling path comprises successive portions including a first portion cooling the inverter, a second portion passing cooling the rotor, a third portion cooling the stator and a fourth portion cooling the gearbox. The cooling fluid flows through these portions one after the other. Notably, the cooling path is formed in each part of the integrated system so as to cool the part at the closest.

According to an embodiment, said gearbox comprises a lubricant circuit receiving lubricating oil, said lubricant circuit being fluidly independent from the cooling system and thermally coupled to said coolant system. Advantageously, the cooling fluid passes through a heat exchanger which allows exchange of heat between the cooling fluid and the lubricating oil. Therefore, the invasion of the cooling system is limited in the gearbox. It is not necessary to provide long cooling channels in the gearbox. The lubricating oil is cooled down. Thereafter the lubricant oil is sprayed over hot spots of the gearbox.

According to an aspect of the invention, the electric motor comprises a casing enclosing the rotor and the stator, said casing having:
- a lateral part in the shape of a cylinder, extending along the electric motor axis to enclose the stator,
- a first end part at a first axial end of said electric motor, forming a so called B-shield, closing a first axial end of the lateral part, and
- a second end part at a second axial end of said electric motor opposite to the first axial end of said electric motor, said second end part forming a so called A-shield closing a second axial end of the lateral part According to a variant, said A-shield is also a part of a casing of the gearbox. Therefore, said A-shield is shared between the casing of the electric motor and the casing of the gearbox. In particular, the A shield of the electric motor has a concave shape opposite to the electric motor side, so as to receive components of the gearbox and to form a casing of the gearbox. Therefore, the gearbox is at least partly positioned on the A-shield of the electric motor.

According to an embodiment, the electric motor includes a hollow rotor shaft to which the rotor is fixedly attached. The inner space of the rotor shaft extends along the axis of the rotor shaft and is configured to receive the coolant fluid for cooling the rotor. The B-shield comprises a first channel configured to transfer the coolant fluid to the rotor shaft and a second channel communicating with a cooling channel of the stator so as to transfer the coolant fluid from the rotor to the cooling channel of the stator. Owing to the second channel, the cooling fluid is sent to the stator so as to cool it. By integrating this second channel in the B-shield the integration of the cooling system in the parts of the integrated system is improved.

Advantageously, the B-shield comprises:
- a peripheral portion which is integral with said lateral part of the casing, said peripheral portion facing axially the stator, and
- a center portion which is distinct from the peripheral portion and faces axially the rotor shaft and comes in a sealed relationship with the peripheral portion, and the first channel and the second channel each have a first portion formed in the center portion of the B-shield and a second portion formed in the peripheral portion of the B-shield. By integrating the first and second channels in both the peripheral portion and the center portion, the dimensions of the motor are reduced with respect to a case where the cooling channels would be integrally formed in the center portion. In such a case the channels would have to cross the peripheral portion over its surface increasing thereby the dimension of the motor along its axis. Moreover, the center portion can be removable. Then center portion serves as a service cover so as to replace element in the rotor or rotor shaft, such as a sealing for instance.

According to an embodiment, the casing of the electric motor comprises a portion, called extending portion, which extends from the lateral part of the casing of the electric motor from a position proximal to the B-shield to a position distal from the B-shield, along a direction transverse, in particular perpendicular, with respect to the axis of the electric motor. In particular, the axis of the electric motor corresponds to the axis of the rotor shaft of the electric motor.

Advantageously, said gearbox is configured to transmit a torque from the rotor shaft of the electric motor to an output position at a distance from the electric motor with respect to the axis of the rotor shaft. Said extending portion extends from the lateral part of the casing of the electric motor so as to face the output position of the gearbox and comprises a hole receiving a secondary shaft connected to said output position of the gearbox. Therefore, the system comprises a secondary shaft different from the rotor shaft. Notably, this secondary shaft is supported at one end by the gear box at the output position thereof, so as to receive a torque from the gearbox; and at the other end the secondary shaft is supported by the extending portion. Therefore, the secondary shaft is an output of the gearbox. Notably at the end supported by the extending portion, the secondary shaft can be connected to a drive train of a vehicle. Thus, the integrated system makes available a torque delivered by the gearbox at both axial ends of the system, thereby facilitating its integration in a drivetrain of a vehicle. When connecting the drive train of the vehicle to the integrated drive system, one needs only to connect, on the one hand to the end of the secondary shaft located on the extending portion, and on the other hand at the output point of the gearbox, notably on a side of the gearbox which is not faced to the extending portion. At the output point of the gearbox, a differential gear may be positioned so as to transfer a torque to the left and right wheels of a vehicle, on the one hand through the secondary shaft and on the other hand through the output point from a side of the gearbox which is not faced to the extending portion.

Advantageously, the inverter comprises a casing including components of the inverter, and the casing of the inverter is supported on the casing of the electric motor such that an outer face of the casing of the inverter extends in a plane tangent with respect to the outer surface of the lateral part of the casing of the electric motor. Said outer face of the casing of the inverter, the lateral part of the casing of the electric motor, the extending portion of the casing of the motor and the gearbox define a volume receiving the connecting ducts of the cooling system connecting the inverter, the electric motor and the gearbox. Particularly, said connecting ducts extend only in said volume. Therefore, the connecting ducts are less likely to be broken when installed in the drive train. As a matter of fact, the casing of the inverter, the extending portion, the lateral part of the casing of the motor and the gearbox protect at least partly the connecting ducts. In particular, the connecting ducts are not included into casings of the electric motor, of the gearbox or of the inverter.

Advantageously, the input of a cooling path of the rotor is located in said extending portion, and a first duct connects the output of a cooling path of the inverter to the input of the cooling path of the rotor. Particularly, these input and output are located in said volume defined by the outer face of the casing of the inverter, the lateral part of the casing of the electric motor, the extending portion of the casing of the motor and the gearbox. Therefore, the protection of the cooling system is improved.

Advantageously, a second duct connects an interface of a cooling path of the stator to an interface of a cooling path of the gearbox. The interface of the cooling path of the stator and the interface of the cooling path of the gearbox are included in said volume defined by the outer face of the casing of the inverter, the lateral part of the casing of the electric motor, the extending portion of the casing of the motor and the gearbox. Therefore, the protection of the cooling system is improved.

Advantageously, said extending portion comprises an interface port of the cooling system and a third duct connects an interface of the cooling path of the gearbox to said interface port of the cooling system. Particularly, this third duct is located in said volume defined by the outer face of the casing of the inverter, the lateral part of the casing of the electric motor, the extending portion of the casing of the motor and the gearbox. Therefore, the protection of the cooling system is improved.

According to an embodiment, the inverter is mounted on the lateral part of the casing of the electric motor and extends from the gearbox to the B-shield. Particularly, its dimension along the axis of the motor extends from the B-shield to gearbox. Therefore, the dimension of the integrated system along the axis of the motor is determined by the gearbox and the motor.

The invention is also related to an electric motor comprising a casing enclosing a rotor and a stator, said casing having:
- a lateral part in the shape of a cylinder, extending along the electric motor axis to enclose the stator,
- a first end part at a first axial end of said electric motor, forming a so called B-shield, closing a first axial end of the lateral part, and
- a second end part at a second axial end of said electric motor opposite to the first axial end of said electric motor, said second end part forming a so called A-shield closing a second axial end of the lateral part, and being configured to receive a gearbox.

Said electric motor can comprise any of the features of the electric motor described before.

The invention is also related to an electrical or a hybrid vehicle comprising an integrated drive system as previously described.

The details of one or more embodiments are set forth in the accompanying drawings and the description below.

DETAILED DESCRIPTION

Figure 1:
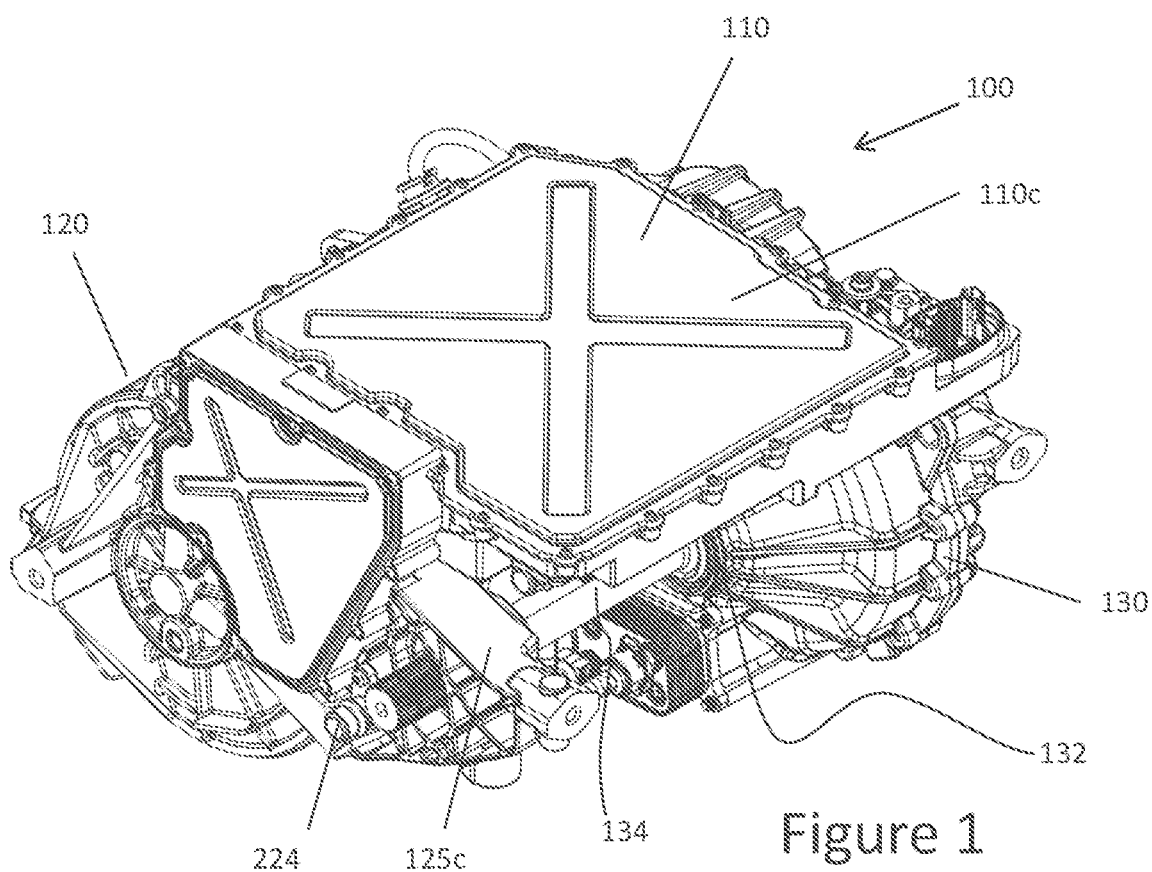
FIG. 1 represents a perspective view of an integrated system according to an example of the invention.
Figure 2:
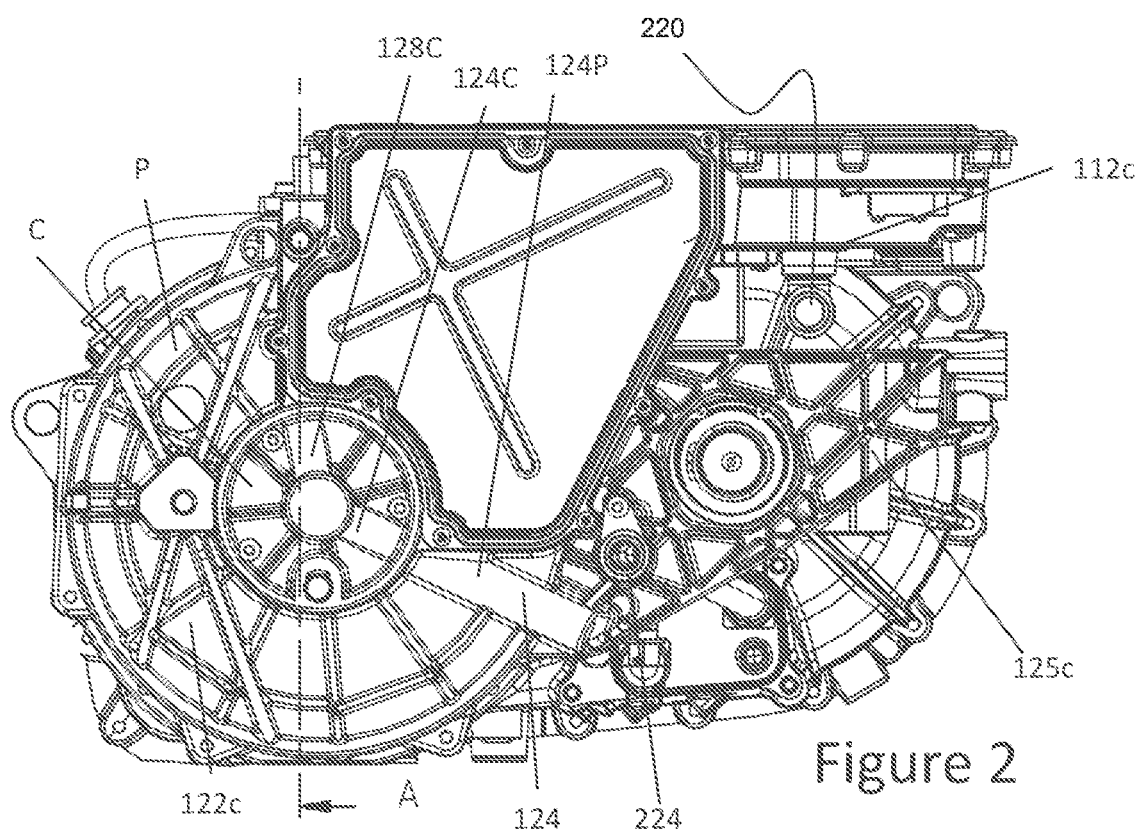
FIG. 2 represents a view of the integrated system of FIG. 1 from an axial thereof.
Figure 3:
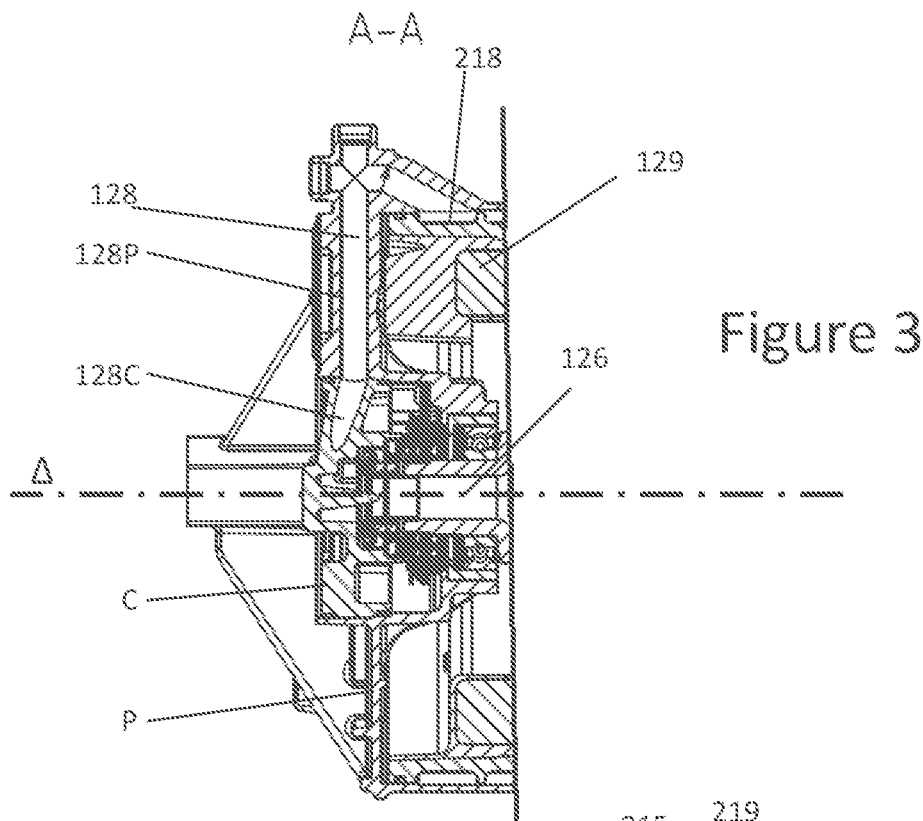
FIG. 3 shows a cut of view of the motor of the system of FIG. 1.
Figure 4:
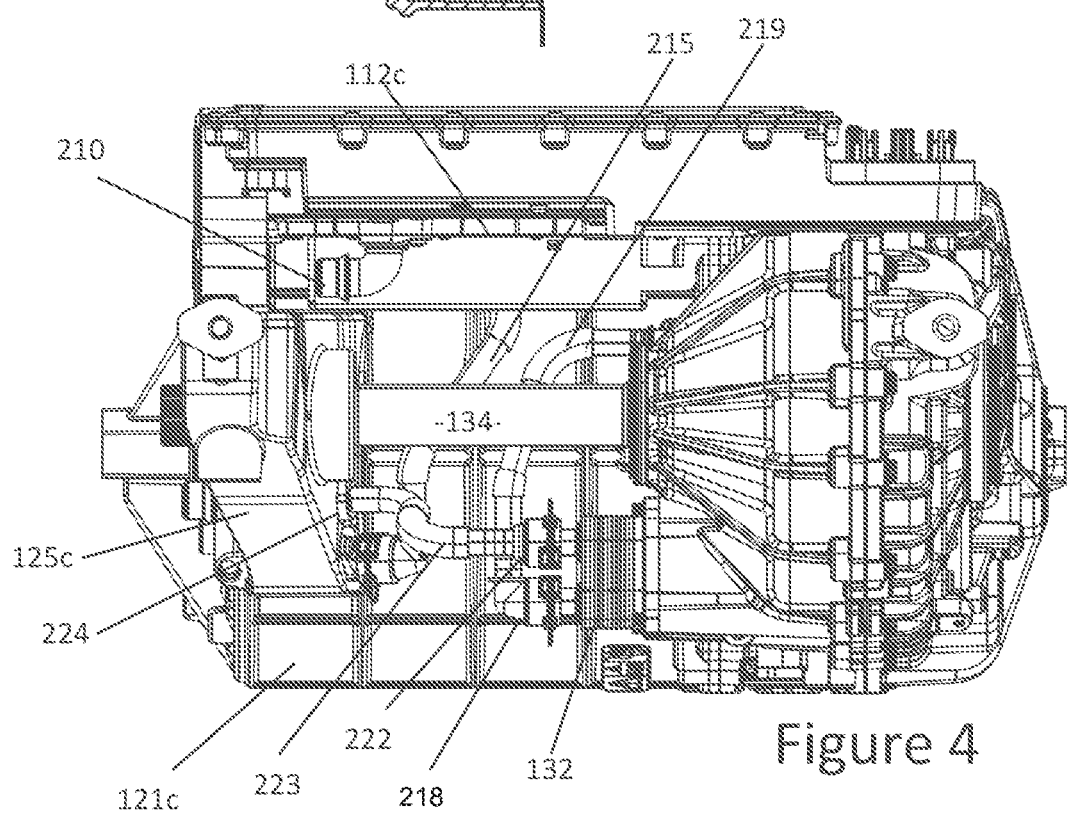
FIG. 4 is a partial side view of the example illustrated in FIG. 1.
Figure 5:
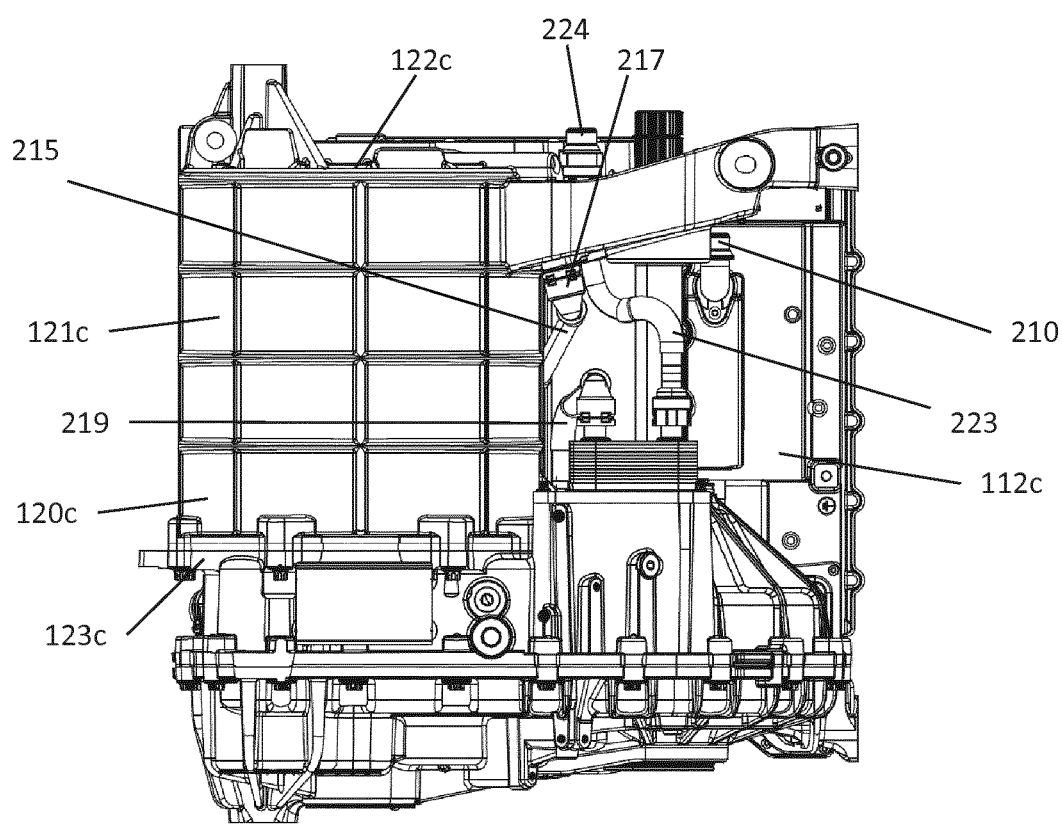
FIG. 5 is a partial perspective view of the example illustrated in FIG. 1.

The drawings illustrate an exemplary integrated drive system 100 according to an embodiment of the invention. The integrated drive system comprises an electric motor 120, an inverter 110, and a gearbox 130. The inverter 110 is configured to control the electric motor 120, notably from a battery. The gearbox 130 is configured to transmit a torque provided by the electric motor 110.

In a variant, the integrated drive system 100 comprises a cooling system in which a coolant fluid is flowing along one cooling path so as to cool the inverter 110, the electric motor 120 and the gearbox 130. Particularly, the cooling system cools the inverter 110, the electric motor 120 and the gearbox 130 one after the other. To this purpose, the cooling system may be arranged as the following. The cooling system may comprise an input port 210 which receives a coolant fluid from outside the integrated drive system 100. The input port 210 connects to a first cooling path portion passing through the inverter 110. Then a first connecting duct 215 connects an output of the first cooling path portion to an input 217 of a second cooling path portion passing through the rotor of the electric motor 120. Specifically, the first connecting duct 215 connects to a first channel 124 inside a casing 120c of the electric motor 120. This first channel 124 conducts the cooling fluid to the rotor shaft 126 of the motor 120. A second channel 128 inside the casing 120c of the electric motor 120 conducts the coolant fluid to a third cooling path portion 218 cooling the stator 129 of the motor 120. Then a second connecting duct 219 connects an output of the third cooling path portion 218 to the input 220 of a fourth cooling path portion which cools the gearbox 130.

Specifically, the gearbox 130 may be cooled owing to a heat transfer between the fourth cooling part portion and a lubricating circuit of the gearbox 130. Such lubricating circuit receives a lubricant oil which is cooled and afterwards sprayed at hot spots of the gearbox and flushed through the inner volume of the casing of the gearbox 130. Such heat transfer between the coolant fluid and the lubricating oil can be implemented by a heat exchanger 132.

The output 222 of the fourth cooling path portion is afterwards connected to an output port 224 of the cooling system by a third connecting duct 223.

In particular, the casing 120c of the electric motor 120 encloses the rotor and the stator 129 of the electric motor 120. In particular, the casing 120c has a lateral part 121c in the shape of a cylinder. The lateral part 121c extends along the axis Δ of the electric motor 120 and encloses the stator 129. A first end part 122c at a first axial end of the electric motor 120 forms a so called B-shield which closes a first axial end of the lateral part 121c. A second end part 123c of the casing 120c forms a so called A-shield, which closes a second axial end of the lateral part 121c. The gearbox 130 is positioned on the A-shield 123c of the electric motor 120. Particularly, the A-shield is also a part of a casing of the gearbox 130. In particular, the A shield 123c of the electric motor 120 has a concave shape opposite to the electric motor side. In its concave shape, the A-shield 123c receives components of the gearbox.

In a variant, the rotor shaft 126 comprises a hollow space inside, so as to receive the coolant fluid. This inner space may extend all along the axis Δ of the rotor shaft 126 so as to lead the coolant fluid inside the rotor shaft 126. Said inner space communicates with the first channel 124 so as to receive the coolant fluid and with the second channel 128 so as to output the coolant fluid to the lateral part 121c of the casing 120c of the electric motor 120.

In a particular variant, the B-shield 122c comprises a peripheral portion P which is integral with the lateral part 121c of the casing 120c and a center portion P which is distinct from the peripheral portion P. The peripheral portion P faces axially the stator 129 and the center portion P faces axially the rotor shaft 126. At least a sealing can be positioned at the interface of the center portion C and the peripheral portion P so as to seal the inner space of the electric motor 120. Such sealing could be an O-ring. The first channel 124 has a first portion 124C formed in the center portion C of the B-shield 122c and a second portion 124P formed in the peripheral portion P of the B-shield 122c. Similarly, the second channel 128 has a first portion 128C formed in the center portion C of the B-shield 122c and a second portion 128P formed in the peripheral portion P of the B-shield 122c. This configuration makes the electric motor 120 more compact. Moreover, the center portion C is preferably removable, allowing thereby an access to the inner part of the motor 120 for reparations for instance.

Specifically, the gearbox 130 may be configured to transmit a torque from the rotor shaft 126 to an output position 132 at a distance from the electric motor 120 with respect to the axis Δ of the rotor shaft 126.

In a variant, the casing 120c of the electric motor 120 comprises a portion 125c, called extending portion, which extends from the lateral part 121c of the casing 120c of the electric motor 120. The extending portion 125c extends from a position proximal to the B-shield 122c to a position distal with respect to the B-shield 122c, along a direction transverse, in particular perpendicular, with respect to the axis Δ of the rotor shaft 126. In a particular variant, the extending portion 125c faces the output position 132 of the gearbox 130 with respect to the axis Δ, and comprises a hole 126c receiving a secondary shaft 134 connected to the output position 132 of the gearbox 130.

Specifically, the inverter 110 may comprise a casing 110c including components of the inverter 110. In particular, the casing 110c of the inverter 110 is supported on the casing 120c of the electric motor 120 such that an outer face 112c of the casing 110c of the inverter 110 extends in a plane tangent with respect to the outer surface of the lateral part 121c of the casing 120c of the electric motor 120.

In a variant, this outer face 112c of the casing 110c of the inverter 110, the lateral part 121c of the casing 120c of the electric motor 120, the extending portion 125c of the casing 120c of the motor 120 and the gearbox 130 define together a volume wherein the connecting ducts 215, 219, 223 of the cooling system are included. Particularly, these connecting ducts 215, 219, 223 are completely included inside this defined volume. Therefore, the connecting ducts 215, 219, 223 are at least partly protected.

Advantageously, the input 217 of the second cooling path portion passing through the rotor 129 is located in the extending portion 125c. Particularly, the input 217 and the output of the first cooling path portion are located inside this defined volume. Similarly, the output of the third cooling path portion 218 and the input 220 of the fourth cooling path portion are advantageously included in this defined volume. Particularly, the output port 224 of the cooling system is advantageously positioned in the extending portion 125c.

It should be understood that the invention is not limited to the specific example described in the preceding paragraphs and that an integrated drive system or an electric motor in the scope of the invention can be obtain from one or a combination of the embodiments or variants described herein.

The invention claimed is:

1. An integrated drive system comprising:
   an electric motor having a stator and a rotor, an inverter configured to control said electric motor, a gearbox configured to transmit a torque provided by the electric motor, and a coolant system,
   wherein the coolant system comprises a cooling fluid, configured to follow one cooling path for cooling the inverter, the rotor, the stator and the gearbox,
   wherein the electric motor comprises a casing enclosing the rotor and the stator; said casing having a lateral part in a shape of a cylinder, extending along an electric motor axis to enclose the stator, a first end part at a first axial end of said electric motor forming a B-shield, closing a first axial end of the lateral part; and a second end part at a second axial end of said electric motor opposite to the first axial end of said electric motor, said second end part forming an A-shield closing a second axial end of the lateral part,
   wherein the casing of the electric motor comprises an extending portion, which extends from the lateral part of the casing of the electric motor from a position proximal to the B-shield to a position distal from the B-shield, along a direction perpendicular with respect to the axis of the electric motor,
   wherein the electric motor includes a rotor shaft to which the rotor is fixedly attached, and said gearbox is configured to transmit a torque from the rotor shaft of the electric motor to an output position at a distance from the electric motor with respect to the axis of the rotor shaft,
   wherein said extending portion extends from the lateral part of the casing of the electric motor so as to face an output position of the gearbox and comprises a hole receiving a secondary shaft connected to said output position of the gearbox,
   wherein the inverter comprises a casing including components of the inverter, and the casing of the inverter is supported on the casing of the electric motor such that an outer face of the casing of the inverter extends in a plane tangent with respect to an outer surface of the lateral part of the casing of the electric motor, and
   wherein said outer face of the casing of the inverter, the lateral part of the casing of the electric motor, the extending portion of the casing of the motor and the gearbox define a volume receiving connecting ducts of the cooling system connecting the inverter, the electric motor and the gearbox.

2. An integrated drive system according to claim 1 in which the cooling fluid is configured to cool successively the inverter, the rotor, the stator and the gearbox.

3. Integrated drive system according to claim 2, in which said cooling path comprises successive portions including a first portion cooling the inverter, a second portion cooling the rotor, a third portion cooling the stator and a fourth portion cooling the gearbox.

4. Integrated drive system according to claim 1, in which an inner space of the rotor shaft extending along an axis of the rotor shaft and being configured to receive the cooling fluid for cooling the rotor, and
   the B-shield comprising a first channel configured to transfer the cooling fluid to the rotor shaft and a second channel communicating with a cooling channel of the stator so as to transfer the cooling fluid from the rotor to the cooling channel of the stator.

5. Integrated drive system according to claim 1, in which the B-shield comprises:
   a peripheral portion which is integral with said lateral part of the casing, said peripheral portion facing axially the stator, and
   a center portion which is distinct from the peripheral portion and faces axially the rotor shaft and comes in a sealed relationship with the peripheral portion,
   wherein the first channel and the second channel each have a first portion formed in the center portion of the B-shield and a second portion formed in the peripheral portion of the B-shield.

6. Integrated drive system according to claim 5, in which the input of a cooling path of the rotor is located in said extending portion and a first duct connects the output of a cooling path of the inverter to the input of the cooling path of the rotor.

7. Integrated drive system according to claim 1, in which a second duct connects an interface of a cooling path of the stator to an interface of a cooling path of the gearbox, the interface of the cooling path of the stator and the interface of the cooling path of the gearbox being included in said volume.

8. Integrated drive system according to claim 5, in which said extending portion comprises an interface port of the cooling system and a third duct connects an interface of the cooling path of the gearbox to said interface port of the cooling system.

* * * * *